United States Patent
Strini

(10) Patent No.: US 6,272,709 B1
(45) Date of Patent: Aug. 14, 2001

(54) COMBINATION FISHING FORCEPS AND KNOT TYING DEVICE

(76) Inventor: Timothy J. Strini, 70 Eddy Rd., Barkhamsted, CT (US) 06063

( * ) Notice: Subject to any disclaimer, the term of this patent is extended or adjusted under 35 U.S.C. 154(b) by 0 days.

(21) Appl. No.: 09/615,815

(22) Filed: Jul. 13, 2000

(51) Int. Cl.⁷ .................................................. B25F 1/00
(52) U.S. Cl. ......................................... 7/106; 289/17; 43/4
(58) Field of Search ................................ 7/106; 43/1, 4; 289/17

(56) References Cited

U.S. PATENT DOCUMENTS

| 2,758,858 | 8/1956 | Smith . | |
|---|---|---|---|
| 2,895,478 | 7/1959 | Post . | |
| 2,926,036 | 2/1960 | Wimberley . | |
| 4,101,152 | * 7/1978 | Gardipee | 289/17 |
| 4,864,762 | 9/1989 | Cox . | |
| 4,899,482 | 2/1990 | Gerdes . | |
| 5,557,874 | 9/1996 | Pietrandrea et al. . | |
| 5,791,699 | * 8/1998 | High | 289/17 |
| 6,061,858 | * 5/2000 | Shepard | 7/106 |

* cited by examiner

Primary Examiner—James G. Smith
(74) Attorney, Agent, or Firm—William C. Crutcher

(57) ABSTRACT

A multipurpose fishing tool for tying knots comprises an improvement in a known fishing forceps by adding an annular groove around the nose of the forceps. The grove is of sufficient depth to retain a loop of fishing line, which is twisted as the forceps jaws are moved in a rotary or nutating motion. The forceps jaws are also utilized to hold the fishing line during the knot typing process.

6 Claims, 2 Drawing Sheets

Figure 4:
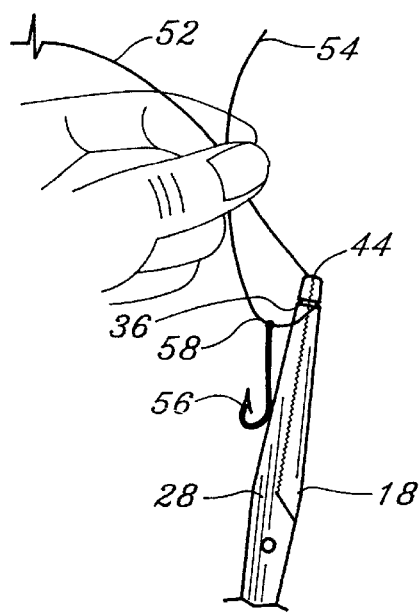

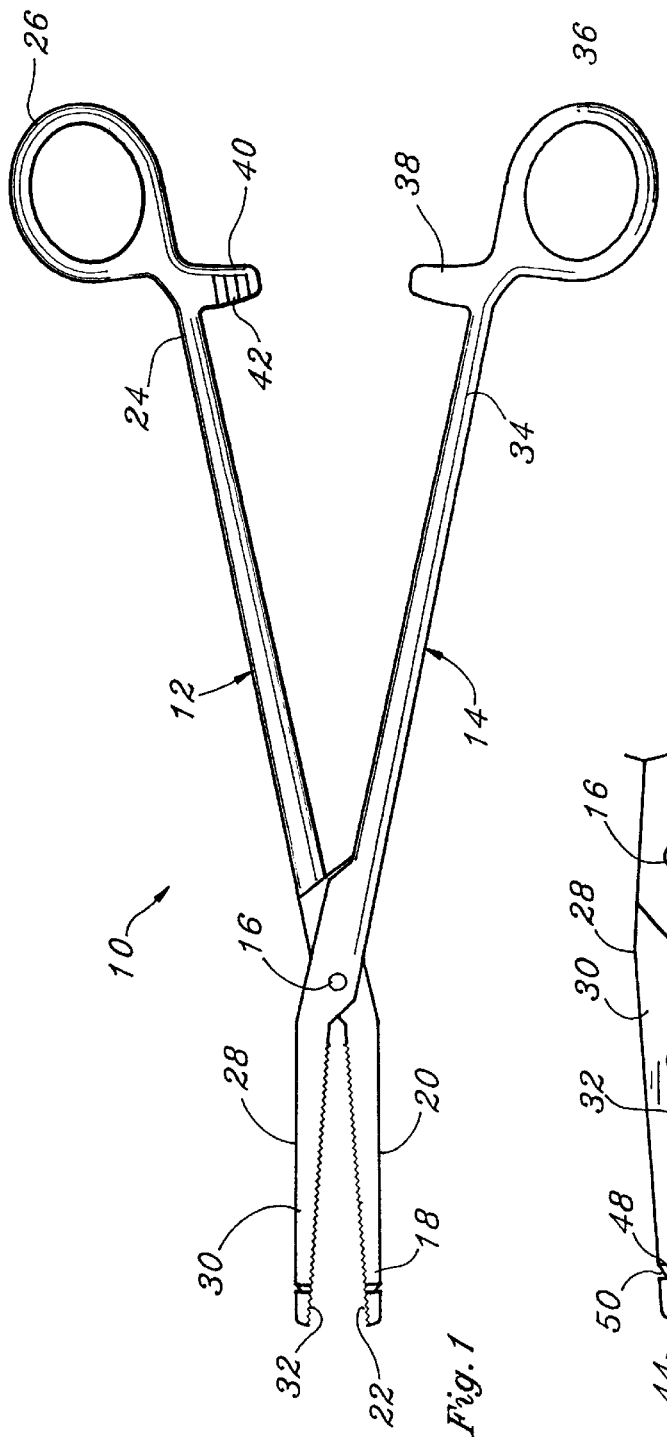
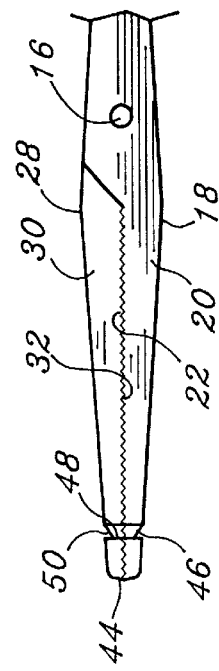
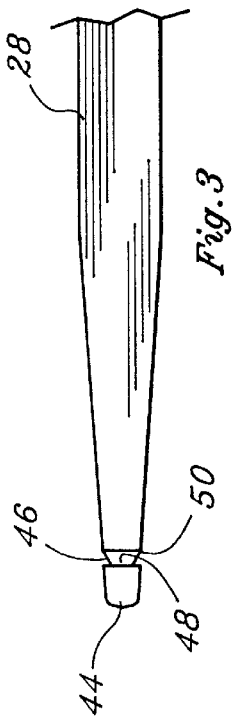
Fig. 1
Fig. 2
Fig. 3

COMBINATION FISHING FORCEPS AND KNOT TYING DEVICE

This invention relates generally to fishing accessories, especially knot tying devices, and more particularly to a multi-purpose fishing tool especially adapted to assist in tying knots for fly fishing.

BACKGROUND OF THE INVENTION

In fly fishing, in order to be successful, the fisherman must be able to change different flies depending on the conditions and depending upon what the fish are feeding on. During the course of time on the water, the fisherman may change flies half a dozen to a dozen times, until he hits the correct fly pattern for the conditions in order to catch fish. So, fly fishermen need a simple, convenient way to change flies. Secondly, every time the fisherman changes a fly he has to cut the old fly off the line and tie on a new fly. And every time he changes a fly he shortens the length of the fly line. Depending on the type of leader and tippet situation that he is using, he may have only about a foot or two feet of line available to be trimmed every time he changes a fly. So, the object is to use or waste as little of the fly line as possible each time he ties the fly, and he wants to be able to tie the fly conveniently.

A number of special devices have been suggested for assisting fishermen and others in the knot tying process. Descriptions of some of prior art knot tying devices are contained in the following list of patents, which list is not all inclusive but merely representative.

| Patent No. | Inventor | Issue Date | Title |
|---|---|---|---|
| 2,758,858 | Smith | Aug. 15, 1956 | Knot-Tying Implement |
| 2,926,036 | Wimberley | Feb. 23, 1960 | Fisherman's Knot Tying Tool |
| 4,101,152 | Gardipee | Jul. 18, 1978 | Fisherman's Knot Tying Jig |
| 4,864,762 | Cox | Sept. 12, 1989 | Line Tying Device |

Many fly fishermen carry a hemostat or fishing forceps in their fishing vests. Fly fishermen generally will use the hemostat first of all for removing a hook from mouth of a fish which they've caught. The hemostat is also used as a pair of pliers for crimping a split shot; it is also used as a pair of pliers to crimp the barb on fishing hooks or fly hooks. Occasionally, the fisherman requires barbless hooks, so he can use the hemostat to crimp over the barb on the hook. They are also used as a pair of "tweezers" to pluck small flies out of storage boxes. Some flies are very tiny and the fisherman uses the hemostat to reach down into the fly box and actually pluck out a fly, because it is too difficult to get them directly with the fingers.

The knot tying tools mentioned above necessitate a fisherman carrying an extra piece of equipment in the pocket or on a lanyard. It has occurred to others to modify a hemostat or fishing forceps to act as a multi-purpose device, so as to avoid adding an extra tool to be carried. Following is a list of prior art in which modified hemostats or fishing forceps have been disclosed, the list not being all inclusive but merely representative.

| Patent No. | Inventor | Issue Date | Title |
|---|---|---|---|
| 2,895,478 | Post | Jul. 21, 1959 | Suture-Tying Instrument |
| 4,899,482 | Gerdes | Feb. 13, 1990 | Multi-Utility Fishing Tool |
| 5,557,874 | Pietrandrea et al. | Sept. 24, 1996 | Multi-Purpose Fishing Tool |

The modifications shown in the above patents involve substantial change and costly adaptations of standard hemostats.

It would be desirable to provide a simple modification of a forceps or hemostat of the type carried by fishermen, so as to assist the fisherman in the knot tying process.

It would also be desirable to reduce the cost of modifying a standard hemostat and to adapt it so as to serve as a simplified knot tying tool.

SUMMARY OF THE INVENTION

Briefly stated, the invention comprises the improvement in a known forceps of the type having a pair of pivotable members each comprising a slender jaw at one end, the jaw defining a smooth, gently tapered, outer surface and a roughened closure surface, and a handle at the other end terminating in a finger loop, a pivot pin connecting the pair of pivotable members so as to enable the jaws to open and close when actuated by the finger loops, and means for clamping the jaws in a fixed position to hold an object between said closure surfaces without actuating the finger loops, the improvement comprising an annular groove defined in the outer surface of the jaws when they are substantially closed along a longitudinal axis, the groove being of sufficient depth to hold a loop of fishing line as the forceps jaws are nutated within said loop of fishing line, and being of a shape to prevent the loop from slipping off the tapered outer surface as the forceps jaws are nutated.

Preferably the annular groove is defined by a first annular wall which is substantially perpendicular to said longitudinal axis and a second tapered annular wall which extends from the first annular wall to said outer tapered surfaces in the direction of the forceps pivot pin, and wherein the annular groove is on the order of 0.015 to 0.020 inches deep.

DRAWINGS

Further objects and advantages of the invention will be better understood by reference to the following description, taken in connection with the accompanying drawing, in which:

FIG. 1 is a plan view of a forceps or hemostat of a known type, in which the jaws have been modified in accordance with the present invention, FIG. 2 is an enlarged plan view of the forceps jaws in a closed position, FIG. 3 is an enlarged side view of the forceps jaws of FIG. 2, and FIGS. 4 through 7 are successive schematic diagrams illustrating a knot tying process utilizing the modified forceps of the present invention as used to tie a clinch knot.

DESCRIPTION OF THE PREFERRED EMBODIMENT

Referring to FIG. 1 of the drawing, a conventional hemostat or forceps (either device known hereinafter as forceps)

is shown, which has been modified in accordance with the present invention. The forceps shown generally at 10 comprise a pair of pivotal members 12, 14, pivotally connected by a pivot pin 16. Member 12 includes a slender jaw 18 with a smooth gently tapered outer surface 20 and a roughened closure surface 22 at one end. At the other end, member 12 includes a handle 24 terminating in a finger loop 26. Similarly, member 14 comprises a slender jaw 28, with a smooth gently tapered outer surface 30, and a roughened closure surface 32 at one end. At the other end, a handle 34 terminates in a finger loop 36.

A well-known means for locking the handles 12, 14 of the forceps in a fixed position comprises a pair of protruding clamping members 38, 40 with opposed interlocking surfaces as indicated at 42. In a known manner, the clamping members 38, 40 permit locking the forceps handles so that jaws 18, 28 may range from a fully-closed position with closure surfaces 22, 32 contacting one another to a partially opened position for holding an object between the closure surfaces without actuating the finger loops 26, 36.

FIGS. 2 and 3 illustrate an enlarged view of jaws 18, 28 in a closed position, so that the closure surfaces 22, 32, which may be roughened or serrated so as to hold an object. When the jaws are in the closed position, about a longitudinal axis A—A the smooth outer surfaces 20, 30 cooperate to define a smooth surface generally tapering toward the tip 44 of the forceps.

In accordance with the present invention, an annular groove 46 is defined in the outer surface of jaws 18, 28 when the jaws are closed as shown in FIG. 2, spaced a short distance from tip 44. Groove 46 is formed by an annular wall 48 which is substantially perpendicular to the longitudinal axis A—A of the closed forceps and a tapered wall 50 extending between the base of wall 48 and the outer surfaces 20, 30 of the forceps. The tapered wall 50 is more sharply tapered, i.e., at a greater angle to axis A—A than the angle formed by the outer surface of the jaws, and preferably forms an angle of around 45° with axis A—A. The depth of the groove is exaggerated in the drawing and is preferably on the order of 0.015 and 0.025 inches, or perhaps deeper in some cases. This is a very small groove, but is designed to be of sufficient depth to accommodate a loop or turn of fishing line and to retain it from coming off the tip 44 with wall 48 as the tool is manipulated in a manner to be described.

OPERATION

Referring now to FIGS. 4 through 7 of the drawing, the operation of the invention will be described. FIGS. 4–7 show the successive steps in tying a clinch knot on a piece of fishing line using the improved forceps of the present invention. The fishing line is comprised of a standing part 52 terminating in a free end 54. The eyelet of a hook or fly 56 is inserted over the free end 54 and held in a loop 58 by the operator. Loop 54 is passed over the tip 44 of closed forceps jaws 18, 28. Loop 58 is positioned so that it is caught in the annular groove 36.

Figure 5:
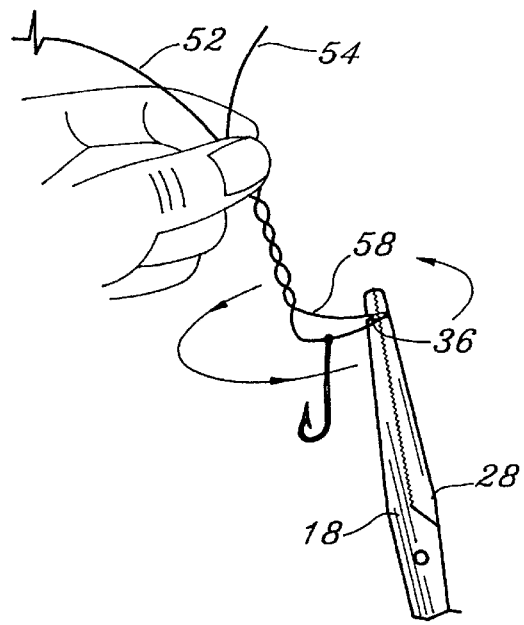

Referring to FIG. 5 of the drawing, the free end 54 is held pinched by the operator's fingers against standing part 52 while the tool is manipulated as shown in a circular motion with the loop 58 riding in groove 36. The type of motion is sometimes called nutation, which is a wobbling of the axis of the forceps, whereby with each rotation, a twist is formed in loop 58 as indicated in the drawing.

Figure 6:
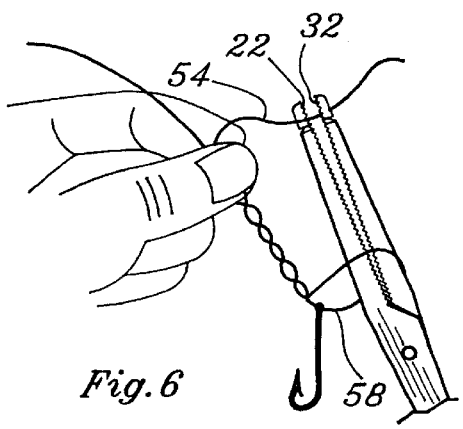

Referring to FIG. 6 of the drawing, the untwisted portion of loop 58 is slid over the tapered surface 50 out of the groove 36 toward the pivot pin of the forceps. This allows the forceps jaws to be opened. The free end 54 is now clamped between the closure surfaces 22, 32 of the jaws 18 and 28.

Figure 7:
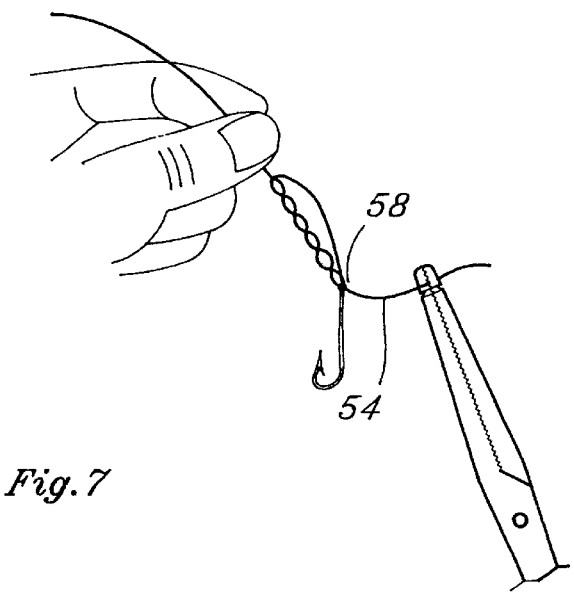

Referring now to FIG. 7, the loop 58 is slipped over the clamped free end 54 of the line. The free end 54 is then pulled through the loop 58 by the forceps jaws and tightened to complete the knot.

While a preferred form of the annular groove modifying the forceps comprises a annular wall perpendicular to the forceps axis connected by a tapered wall as shown in FIGS. 2 and 3, the dimensions can vary depending upon the type of fishing line. The groove should merely be of sufficient depth to hold a loop of fishing line as the forceps jaws are nutated within the loop, and of a shape such as to prevent the loop from slipping off the tapered outer surface as the forceps jaws are nutated. It is desired to secure in the appended claims all such modifications as fall within the true spirit and scope of the invention.

What is claimed is:

1. Combination fishing forceps and knot tying device, comprising:

the improvement in a known forceps of the type having a pair of pivotable members each comprising a slender jaw at one end, said jaw defining a smooth, gently tapered, outer surface and a roughened closure surface, and a handle at the other end terminating in a finger loop, and a pivot pin connecting the pair of pivotable members so as to enable the jaws to open and close to hold an object between said closure surfaces when actuated by the finger loops, said improvement comprising:

an annular groove defined in the outer surface of the jaws when they are substantially closed along a longitudinal axis, said groove being of sufficient depth to hold a loop of fishing line as the forceps jaws are nutated within said loop of fishing line, and being of a shape to prevent the loop from slipping off the tapered outer surface as the forceps jaws are nutated.

2. The improvement according to claim 1, wherein said annular groove is defined by a first annular wall which is substantially perpendicular to said longitudinal axis and a second tapered annular wall which extends from the first annular wall to said outer tapered surfaces in the direction of the forceps pivot pin.

3. The improvement according to claim 1, wherein said annular groove is on the order of 0.015 to 0.020 inches deep.

4. The improvement according to claim 1, wherein the annular groove is spaced from the ends of the jaws, and includes a first wall portion generally facing the pivot pin and includes a second wall portion tapering from the base fo the first wall portion toward the pivot pin.

5. The improvement according to claim 4, where the second wall portion tapers at an angle of approximately 45° with respect to said longitudinal axis.

6. Combination fishing forceps and knot tying device, comprising the improvement in a known forceps of the type having a pair of pivotable members each comprising a slender jaw at one end, said jaw defining a smooth, gently tapered, outer surface and a roughened closure surface, and a handle at the other end terminating in a finger loop, a pivot pin connecting the pair of pivotable members so as to enable the jaws to open and close when actuated by the finger loops, and means for clamping the jaws in a fixed position to hold an object between said closure surfaces without actuating the finger loops, said improvement comprising:

an annular groove defined in the outer surface of the jaws when they are substantially closed along a longitudinal axis, said groove being defined by a first annular wall which is substantially perpendicular to said longitudinal axis and a second tapered annular wall which extends from the base of the first annular wall to said outer tapered surfaces in the direction of the forceps pivot pin, said groove being of sufficient depth to hold a loop of fishing line as the forceps jaws are nutated within said loop of fishing line, and being of a shape to prevent the loop from slipping off the tapered outer surface as the forceps jaws are nutated.

\* \* \* \* \*